United States Patent
Matsuo et al.

(10) Patent No.: US 8,138,449 B2
(45) Date of Patent: Mar. 20, 2012

(54) METHOD OF JOINING SHEET MEMBERS TOGETHER

(75) Inventors: Naoyuki Matsuo, Ibaraki (JP); Hiroshi Matsuo, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 355 days.

(21) Appl. No.: 12/466,635

(22) Filed: May 15, 2009

(65) Prior Publication Data

US 2009/0283504 A1 Nov. 19, 2009

(30) Foreign Application Priority Data

May 16, 2008 (JP) ................................. 2008-129653

(51) Int. Cl.
*B23K 26/20* (2006.01)
*B29C 65/16* (2006.01)

(52) U.S. Cl. ................ 219/121.64; 156/272.8

(58) Field of Classification Search ............... 156/272.8, 156/157, 159; 428/57, 58, 61, 594, 614, 428/615; 219/121.64, 121.85
See application file for complete search history.

(56) References Cited

U.S. PATENT DOCUMENTS 2,386,345 A * 10/1945 Roesen ................. 242/554.2
3,824,368 A * 7/1974 Locke ..................... 219/121.64
2003/0181881 A1 * 9/2003 Makolin et al. ............. 156/157
2007/0051461 A1 * 3/2007 Pfleging et al. ............. 156/272.8
2008/0096318 A1 * 4/2008 Hariu ......................... 156/159

FOREIGN PATENT DOCUMENTS

| EP | 0556851 A1 | | 8/1993 |
| GB | 1184591 | * | 3/1970 |
| JP | 56-39107 A | * | 4/1981 |
| JP | 59-24526 A | | 2/1984 |
| JP | 5-245630 A | | 9/1993 |
| JP | 07-164172 A | * | 6/1995 |
| JP | 7-251282 A | | 10/1995 |
| JP | 2002-160020 A | | 6/2002 |

OTHER PUBLICATIONS

European Search Report dated Aug. 28, 2009, issued in corresponding European Patent Application No. 09006557.4.

* cited by examiner

*Primary Examiner* — Geoffrey S Evans
(74) *Attorney, Agent, or Firm* — Westerman Hattori Daniels & Adrian LLP

(57) ABSTRACT

A method of joining sheet members together, which enables two sheets to be joined while conveying these sheets and reducing a cause of inferior products as much as possible. The method of joining sheet members includes: bonding an end of a new sheet member to a surface of a preceding sheet member through an adhesive material to form a joined part; and cutting the preceding sheet member at a position rearward of the joined part to join the preceding sheet member with a new sheet member, wherein the preceding sheet member is secured to the new sheet at a position rearward of the joined part. In addition, in the method of joining sheet members, the securing is carried out by welding using laser beam.

3 Claims, 5 Drawing Sheets

METHOD OF JOINING SHEET MEMBERS TOGETHER

CROSS REFERENCE TO RELATED APPLICATION

This application claims priority from Japanese Patent Application No. 2008-129653, which is incorporated herein by reference.

BACKGROUND OF THE INVENTION

1. Field of the Invention

The present invention relates to a method of joining sheet members together and to a sheet joined body, and particularly, to a method of joining sheet members together in which band-like sheet materials are joined together while being conveyed and to a sheet joined body produced by joining band-like sheet materials.

2. Description of the Related Art

In a case of feeding band-like sheet members continuously to a processing machine to process the sheet members, a measure is conventionally taken to join an end of a new sheet member with an end of a sheet member first processed, to feed the new sheet to the processing machine in succession to the preceding sheet member.

As this type of joining method, a method is conventionally known in which as shown in FIG. 6A, a preceding sheet member 101 and a new sheet member 102 are placed in such a condition that ends of these sheets are abutted against each other and an adhesive tape 103 is applied to upper and lower surfaces of both sheet members so as to cover the abutted part, thereby joining both sheet members together.

However, when sheet members are joined together by using such a method, the adhesive tape 103 is attached to both front and back surfaces of the sheet members 101 and 102. Therefore, it is necessary to temporarily stop the conveyance, giving rise to a problem that it is necessary to suspend continuous processing of the sheet members.

Moreover, in order to maintain continuous processing without stopping the conveyance of a sheet member, it is necessary to introduce an accumulator that suspends only the joint part, posing a problem that an introduction of such an accumulator needs an extensive installation space and large installation costs.

On the other hand, as other methods used to join sheet members together, a method is proposed in which as shown in FIG. 6B, the new sheet member 102 is overlapped on the preceding sheet member 101 to join both sheet members together through the adhesive tape 103 disposed in advance at the front end part of the new sheet member 102 and then, the rear side of the preceding sheet member 101 is cut.

Since this method ensures that the new sheet member can be joined while the preceding sheet member is conveyed, it has an advantage that the processing of the sheet member can be continued without using the accumulator as mentioned above.

SUMMARY OF THE INVENTION

However, even in a case of adopting the latter method, when it is intended to join sheet members together while conveying the sheet members, it is difficult to cut a preceding sheet member 101 accurately at an end of a joint area (namely, a rear end of an adhesive tape 103). Therefore, it is inevitable to cut at a position somewhat apart from the joint position, and as a result, a tail 104 is formed at the rear end of the preceding sheet member 101.

However, because no tension acts on the tail 104, the tail 104 flutters when conveying the sheet members, which induces, for example, generation of dust and there is therefore fear as to a cause inferior products.

It is an object of the present invention to provide a method of joining sheet members together, the method enabling two sheet members to be joined together while conveying these sheet members and also, enabling a reduction in the cause of inferior products as much as possible. Another object of the present invention is to provide a sheet joined body reduced in inferior products.

The present invention provides a method of joining sheet members together, and the method includes: bonding an end of a new sheet member to a surface of a preceding sheet member through an adhesive material; and cutting the preceding sheet member at a position rearward of the joined part to join the preceding sheet member with a new sheet member, wherein the preceding sheet member is secured to the new sheet member at a position rearward of the joined part.

Moreover, the present invention provides a method of joining sheet members together wherein the securing is performed by laser welding. The present invention further provides a method of joining sheet members together, wherein the securing is performed on a conveying roller installed in a conveying passage of the sheet members.

Further, the present invention provides a sheet joined body produced by any one of the above joining methods.

The method of joining sheet members according to the present invention ensures that a preceding sheet member is secured to a new sheet member at a position rearward of the joined part of the preceding sheet member and the new sheet member and therefore, the fluttering of the tail of the preceding sheet member can be prevented, making it possible to reduce the cause of inferior products.

Moreover, the method of joining sheet members according to the present invention can be carried out while conveying sheet members and it is therefore possible to join sheet members together without using an accumulator or the like.

Moreover, the sheet joined body according to the present invention is produced by joining sheet members together by a joining method as mentioned above. Therefore, occurrence of inferior products caused by the fluttering of the tail in the subsequent processing steps is prevented and a product of the sheet joined body is of higher quality.

BRIEF DESCRIPTION OF THE DRAWINGS

FIG. 4A is a view showing a case of applying a line beam extending over a whole width in a region where sheet members are bonded to each other, and FIG. 4B is a view showing a case of applying plural laser light beams R arranged along a direction of the width of sheet members;

FIG. 5A is a view showing a case where almost the entire region of a tail part 5 is joined by welding and FIG. 5B is a view showing a case where a plurality of portions are joined by welding along a longitudinal direction of sheet members.

DESCRIPTION OF THE PREFERRED EMBODIMENTS

Hereinafter, an embodiment according to the present invention will be described with reference to the attached drawings.

FIGS. 1 to 4 are views each showing a method of joining sheet members according to the present embodiment. As shown in FIGS. 1 to 4, the method of joining sheet members according to the present embodiment is a method of joining sheet members together, the method involving bonding the end of a new sheet member 2 (hereinafter also referred to as a second sheet member) to the surface of a sheet member 1 (hereinafter also referred to as a first sheet member) through an adhesive material 3 to form a joined part 4, and cutting the first sheet member 1 at a position rearward of the joined part 4 to join the first sheet member with the second sheet member, wherein the first sheet member 1 is secured to the second sheet member 2 at a position rearward of the joined part 4.

Figure 1:
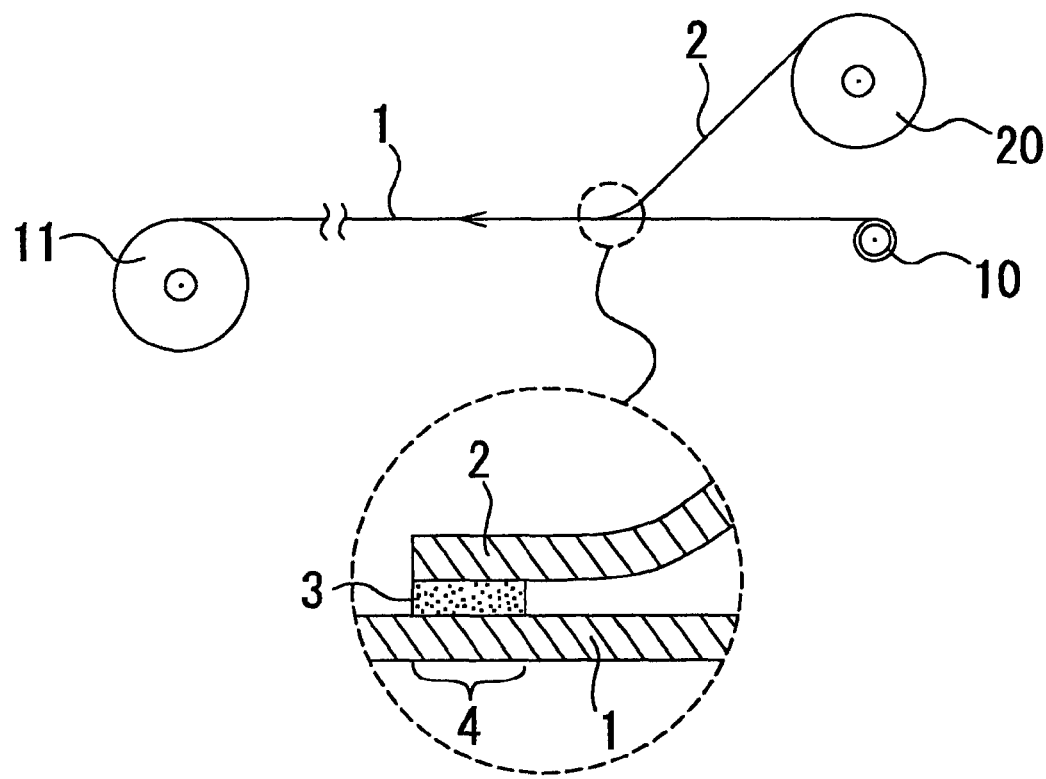
FIG. 1 is a side view showing a sheet-to-sheet boding step as a first step in an embodiment of a method of joining sheet members according to the present invention.

FIG. 1 is a side view showing a sheet-to-sheet bonding step as a first step in the joining method. As shown in FIG. 1, the first sheet member 1 is fed out of a raw sheet roll 10, then processed by desired processing steps (not shown) and then wound as a product roll 11.

In such a case, when an amount of a first sheet member 1 left in the raw sheet roll 10 becomes small as shown in, for example, FIG. 1, a second sheet member 2 is fed out of a raw sheet roll 20 which is replaced for the raw sheet roll 10.

The adhesive material 3 is disposed at the front end of the second sheet member 2, and the second sheet member 2 is fed at the same speed as that of the first sheet member 1. The second sheet member 2 is bonded to the surface of the first sheet member through the adhesive material 3 while conveying both sheet members.

With the above bonding step, the first sheet member 1 and the second sheet member 2 are joined together by the adhesive material 3 to form a joined part 4.

No particular limitation is imposed on the adhesive material 3 and an appropriate material may be selected as the adhesive material 3 from, for example, known materials according to the type of materials used for the sheet members 1 and 2, the properties required in the subsequent processing steps and the other conditions.

Specific examples of the adhesive material 3 may include rubber type adhesive materials utilizing thermoplastic elastomers such as a styrene-butadiene block copolymer and styrene-isoprene copolymer, acryl type adhesive materials containing acrylic ester copolymers as their major components, silicone type adhesive materials containing silicone rubber and silicone resin and vinyl type adhesive materials containing a vinyl ether type polymer as the raw material.

Figure 2:
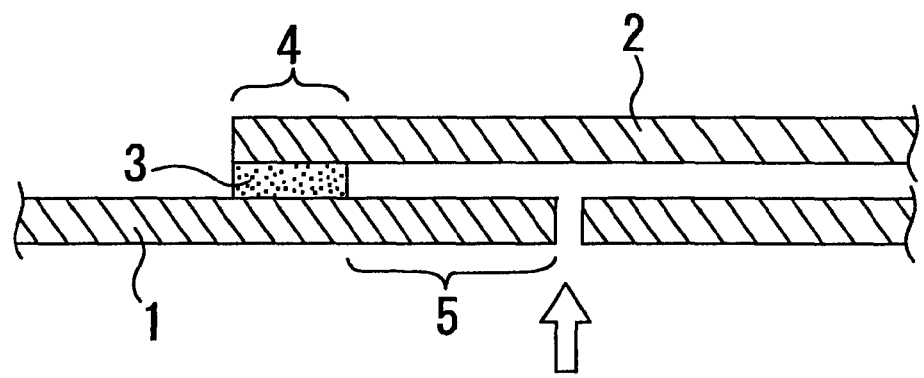
FIG. 2 is a side view showing a cutting step as a second step in the method of joining sheet members according to the present embodiment.

FIG. 2 is a side view showing a cutting step as a second step in the method of joining sheet members according to the present embodiment.

More specifically, as shown in FIG. 2, the first sheet member 1 is cut at a position rearward of the joined part 4 formed by the bonding step with respect to the traveling direction of the first sheet member 1. In FIG. 2, an outline arrow represents the cut position.

Since the first sheet 1 is cut at a position rearward of the joined part 4, the first sheet member 1 is held to extend to a position rearward of the joined part 4, thus forming a so-called tail part 5.

Figure 3:
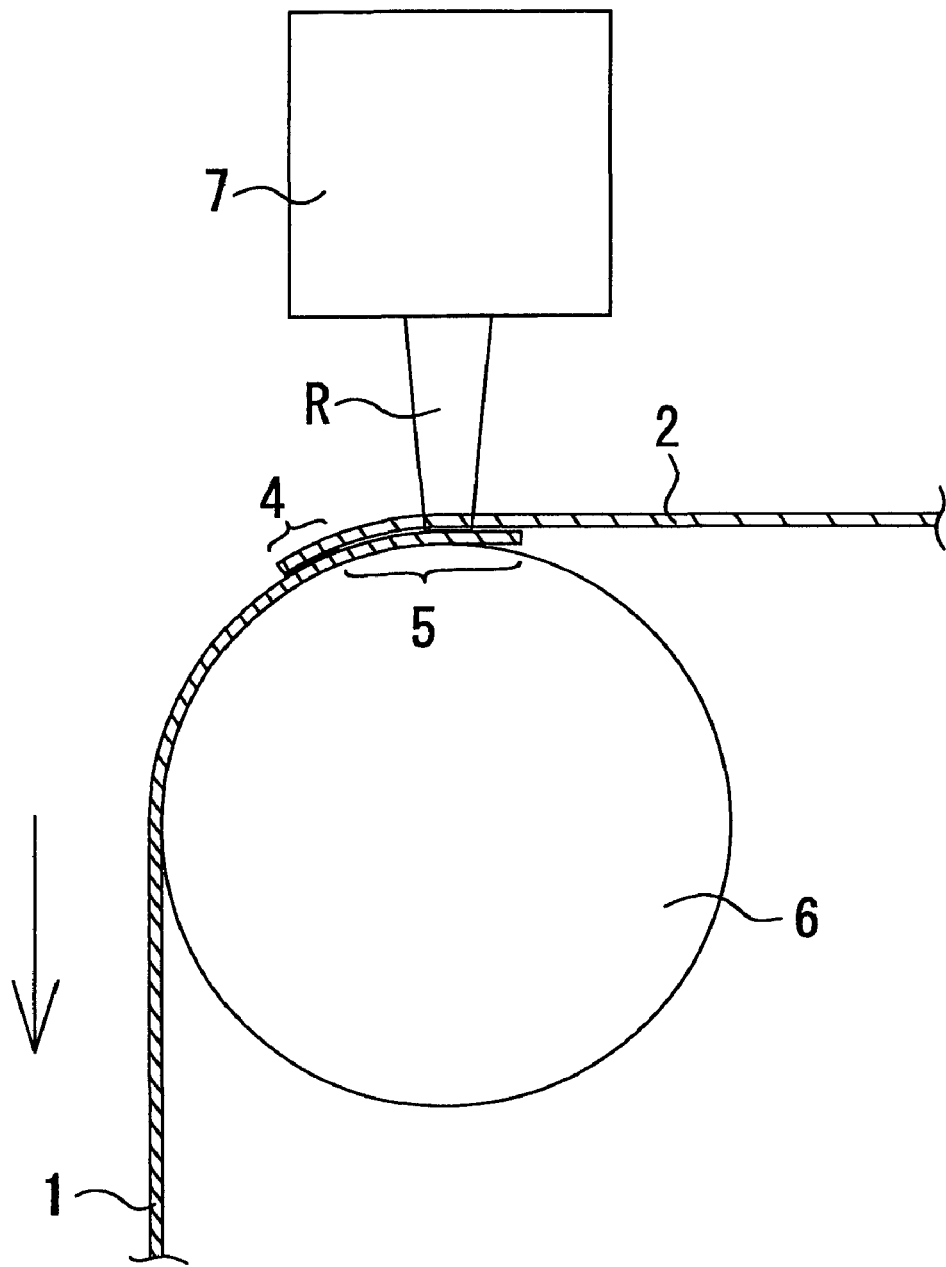
FIG. 3 is a side view showing a fixing step as a third step in the method of joining sheet members according to the present embodiment.

FIG. 3 is a side view showing a fixing step as a third step, that is, a step of fixing the tail part 5 formed by the cutting step to the second sheet member 2 in the method of joining sheet members according to the present embodiment.

In the present embodiment, a method of fixing by joining using laser welding is adopted. Specifically, as shown in FIG. 3, laser light R is emitted from a laser oscillator 7 to join the tail part 5 of the first sheet member 1 with the second sheet member 2 by welding.

No particular limitation is imposed on the laser light R insofar as the laser light is able to join sheet members together by welding. For example, laser light obtained by various oscillation means such as semiconductor laser, Nd-YAG laser and fiber laser may be adopted as the laser light. As an oscillation means, a so-called CW laser (Continuous Wave Laser) in which laser light is continuously applied and a pulse laser such as a femto-second-laser may be adopted.

Among these lasers, a semiconductor laser and fiber laser are preferable from a viewpoint of easily obtaining in-plane uniform beam intensity.

A wavelength of the laser light is preferably in a near-infrared region from a viewpoint that many resin materials have high transmittance for the light having such a wavelength, and therefore the laser light is easily made to reach an interface between the sheet members, making it possible to join these sheet members together by welding at the interface without any adverse influences on a front side of the sheet member.

In order to carry out laser welding, any one of the first and second sheet members preferably has photo-absorbing ability for the laser light. When one of these sheet members has photo-absorbing ability, it is preferable to apply laser light from a side of the other sheet member having no photo-absorbing ability and to make the laser light reach the surface of the sheet member having photo-absorbing ability, thereby making the surface generate heat to join these sheet members together by welding.

When both sheet members have photo-absorbing ability for laser light, the surface of the sheet member on the side irradiated with the laser light may be cooled to suppress damages by the heat of the irradiated surface, thereby joining the sheet members together by welding.

Moreover, when none of these sheets has photo-absorbing ability or when the absorption of the laser light is insufficient, a photo-absorbing agent may be interposed between the first sheet member and the second sheet member so as to have a structure improved in photo-absorbing ability, whereby the photo-absorbing agent is irradiated with laser light to be heated, and thereby joining these sheet materials together by welding.

Examples of the photo-absorbing agent that absorbs the laser light include pigments using porphyrin type compounds, dyes and carbon black.

In addition, when the laser light R is applied, the laser light R is preferably applied on the roll 6 that conveys a sheet member.

Specifically, as shown in, for example, FIG. 3, it is preferable to employ an arrangement, in which the tail part 5 reaches the surface of the roll 6 disposed so as to be in contact with the tail part 5, the tail part 5 is held between the surface of the roll 6 and the second sheet member 2 and the laser light R is applied when the tail part 5 and the second sheet member 2 has been brought into tight contact with each other.

Figure 4A:
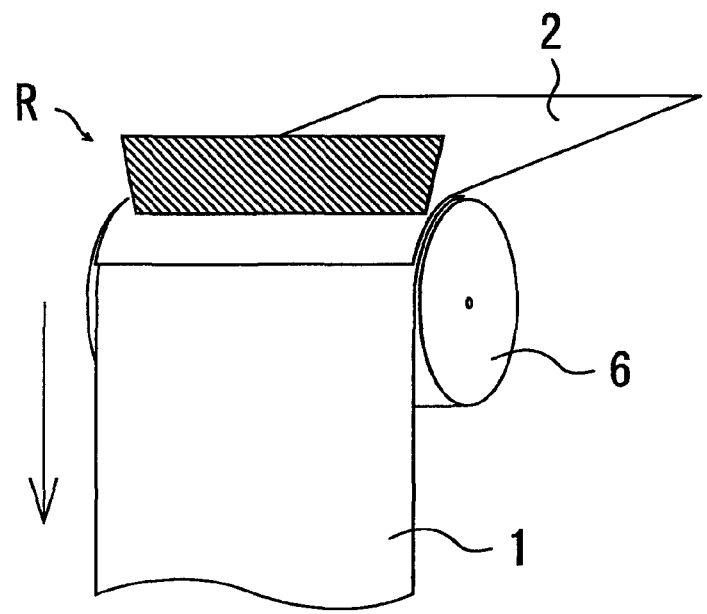
FIGS. 4A and 4B are perspective views showing an irradiation manner of laser light R: where
Figure 4B:
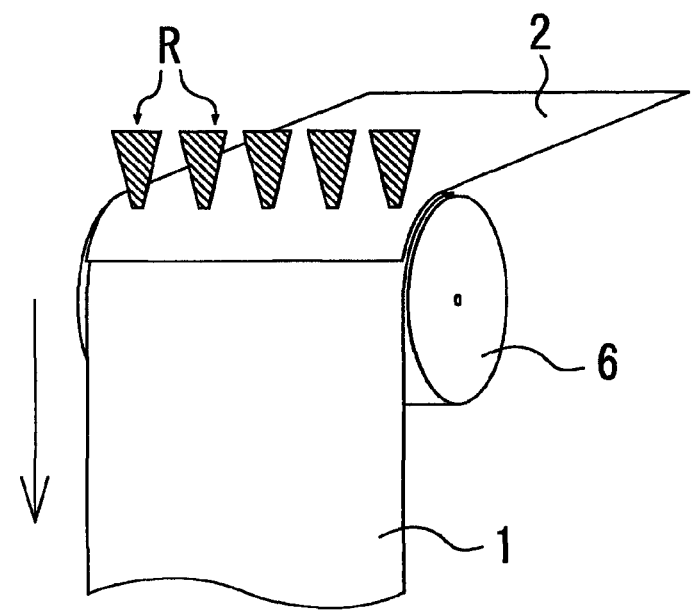

No particular limitation is imposed on the manner of the irradiation of the laser light R, and for example, as shown in FIG. 4A, a line beam may be applied over the whole width of the area where the sheet members have been bonded to each other. In addition, as shown in FIG. 4B, plural laser light beams R arranged along the width direction of the sheet members may be applied.

Moreover, in the joining method according to the present embodiment, the laser light R is applied while conveying the sheet members 1 and 2 and therefore, the welding can be carried out in an area extending to the conveying direction of the sheet members 1, 2 (longitudinal direction of the sheet members) even if the laser light R is not used to scan.

Figure 5A:
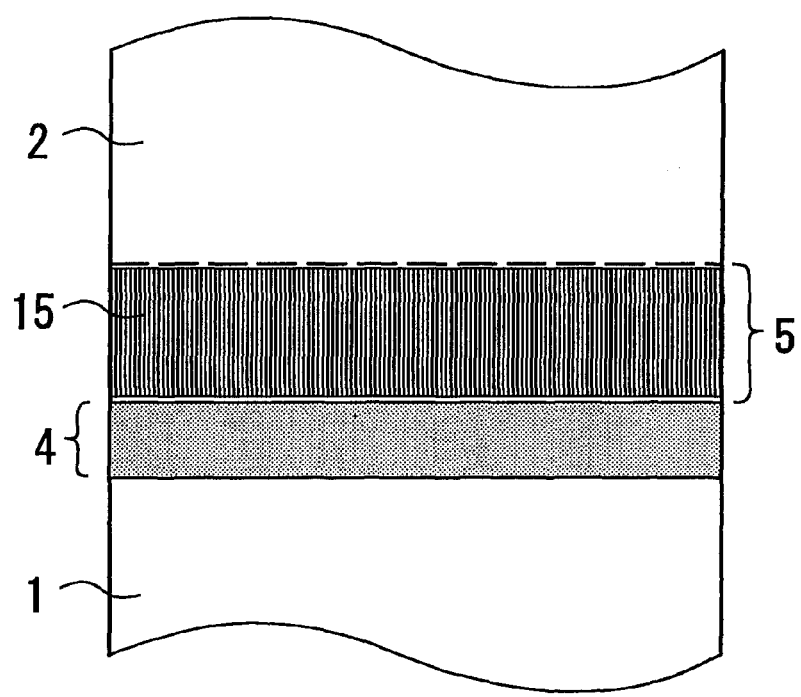
FIGS. 5A and 5B are plan views showing a structure of the joint in one embodiment of a sheet joined body according to the present invention: where
Figure 5B:
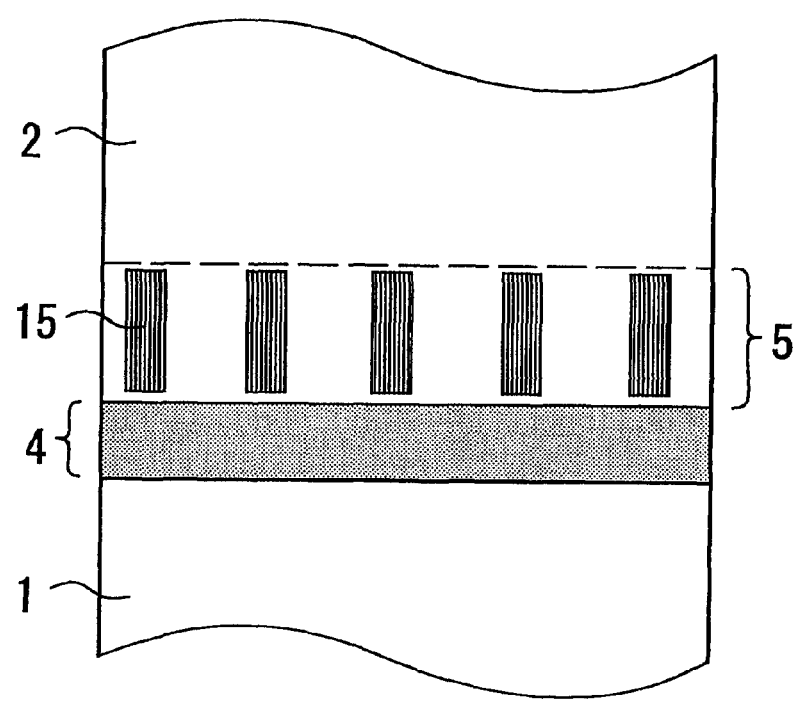
Figure 6A:
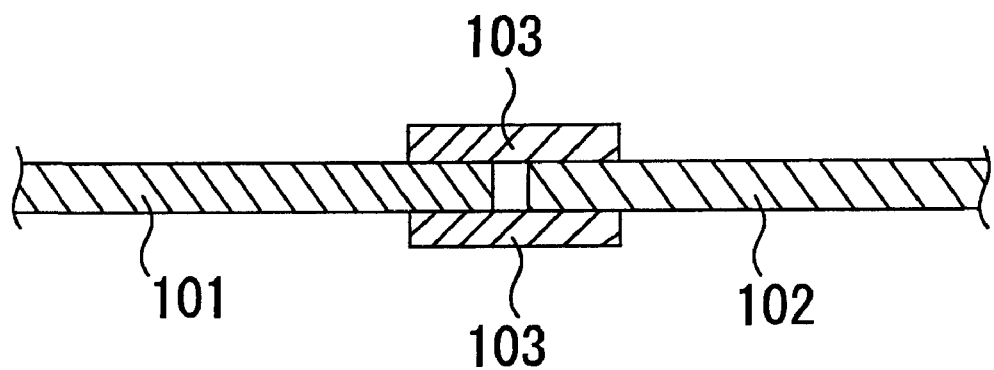
FIGS. 6A and B are views showing a method of joining sheet members according to related art.
Figure 6B:
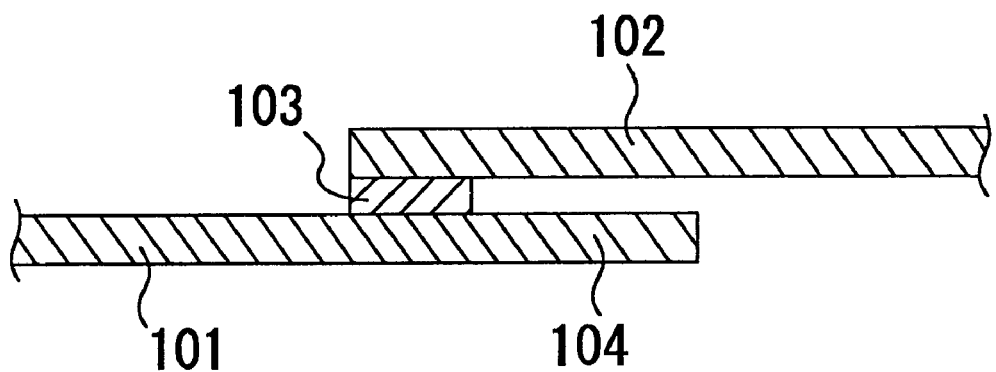

FIGS. 5A and 5B are plan views showing a structure of the joint in one embodiment of a sheet joined body according to the present invention. Specifically, FIG. 5A shows a structure of the joint of the sheet joined body which is obtained by applying the laser light R over the whole range of the width of the sheet member as shown in FIG. 4A, and FIG. 5B shows a structure of the joint of the sheet joined body in which plural laser light beams are applied to form a fused part as shown in FIG. 4B.

In the above manner, a fused part 15 of the sheet joined body may be formed in almost all area of the tail part 5 as shown in FIG. 5A, and also, as shown in FIG. 5B, a plurality of fused parts may be formed along the longitudinal direction of the sheet members.

The embodiment shown in FIGS. 5A and 5B shows an example in which the welding is made continuously from the joined part 4 to the distal end of the tail part 5. However, the present invention is not limited thereto and, for example, laser light may be intermittently applied to the sheet members to fuse a plurality of separate places along the longitudinal direction of the sheet members.

The sheet members joined together in the present invention are not particularly limited in terms of the type of material, the dimension, and the structure such as a monolayer structure or a laminate structure.

Examples which may be adopted as these sheet members include polymer sheets obtained by using any one or more of thermoplastic resins, for example, a polyethylene resin (PE), polypropylene resin (PP) and polyethylene terephthalate resin (PET), heatcurable resins, for example, an epoxy resin (EP) and phenol formaldehyde resin (PF), natural rubber (NR) and rubber such as an ethylenepropylenedien ternary copolymer (EPDM); woven fabrics or nonwoven fabrics formed by synthetic fibers, natural fibers and blended fibers constituted of these fibers; and composite sheets of these compounds.

When one of the sheet members has a structure having light-transmittance as mentioned above, the other sheet member may be a metal type constituted of aluminum, copper, iron or their alloys or a structure provided with the metal layer.

Although no particular limitation is imposed on the thickness of the sheet member to be used in the present invention, the tail part is easily fluttered when the thickness is low, so that an advantageous effect of the present invention tends to be produced. Specifically, the effect of the present invention tends to be produced when the thickness of the sheet member is not more than 500 μm, and more particularly, when the thickness of the sheet member is not more than 250 μm.

Moreover, a Young's modulus of the sheet member may have a large influence on a degree of fluttering. The advantageous effect of the present invention is more exerted for a sheet member having a Young's modulus of not less than 0.1 MPa and not more than 220 GPa.

Moreover, a shape of the tail part may have a large influence on the degree of fluttering. When a ratio of the length of the tail part to the width of the tail part (that is, (tail length/tail width)×100) is 0.5 to 5000% and preferably 2.5 to 2000%, and particularly, when the length of the tale part is 10 mm to 500 mm, the advantageous effect of the present invention tends to be more exerted.

The materials, laminate structures, thicknesses and the like of the first sheet member are not necessarily the same but may be different from the second sheet member.

Although the present embodiment exemplifies the case of using two sheet members, that is, a first sheet member and a second sheet member, three or more sheet members may be joined together to produce a sheet joined body.

Moreover, one end of one sheet may be joined with the other end of the same to form an annular sheet joined body.

Moreover, conventionally known technical particulars may be adopted in the method of joining sheet members together and the sheet joined body according to the present invention to the extent that the advantageous effect of the present invention is not significantly impaired.

EXAMPLES

The present invention will be described in more detail by way of examples, however, the present invention is not limited thereto.

Example 1

Sheet members A and B shown below were bonded to each other while conveying these sheet members at a conveying speed of 100 mm/s under a tension of 100 g by using an adhesive tape, and the sheet member A was cut at the rear side thereof to thereby form a tail part (length: 10 mm, length/width×100=100). Moreover, the tail part was irradiated with laser light having the following specifications to join the tail part by welding.

Working Members
    Sheet member A: made of a polyethylene terephthalate resin (PET), width: 10 mm, thickness: 50 μm
    Sheet member B: made of a polyethylene terephthalate resin (PET), width: 10 mm, thickness: 50 μm Laser Light Irradiation Device
    Laser light source: semiconductor laser
    Wavelength of the laser light: 940 nm
    Output: 22.5 W
    Spot diameter of the laser light: 2 mmφ

The sheet joined body joined with the tail part by welding in the above condition was conveyed, and it was confirmed that the fluttering of the tail part was suppressed. In addition, the joint strength between the sheet member A and the sheet member B was measured in the following method, and it was found that the joint strength (tensile strength) was improved up to 60 N/cm.

Method of Measuring Joint Strength (Tensile Strength)
    A sample cut into a size of 10 mm (width)×75 mm (length) was subjected to a Tensilon type tensile tester at ambient temperature and then pulled in a shearing direction at a rate of 50 mm/min, to measure the stress when the sample was ruptured.

Example 2

The tail part was joined by welding in a similar manner as in Example 1 except that sheet members C and D shown below were used and power of the laser light was changed to 15 W.

Working Members

Sheet member C: made of a polypropylene resin (PP), width: 10 mm, thickness: 40 μm Sheet member D: made of a polypropylene resin (PP), width: 10 mm, thickness: 40 μm The sheet joined body bonded with the tail part in the above condition was conveyed, and it was confirmed that the fluttering of the tail part was suppressed.

Comparative Example 1

A sheet joined body was obtained by joining sheet members together in the similar manner as in Example 1 except that the joining operation by welding using laser light was not carried out. When the sheet joined body was conveyed, it was confirmed that the tail part was fluttered. The joint strength (tensile strength) between the sheet members A and B was 15 N/cm.

This specification is by no means intended to restrict the present invention to the preferred embodiments set forth therein. Various modifications to the method of joining sheet members together and the sheet joined body, as described herein, may be made by those skilled in the art without departing from the spirit and scope of the present invention as defined in the appended claims.

What is claimed is:

1. A method of joining sheet members together, comprising the sequential steps of:

bonding an end of a new sheet member to a surface of a preceding sheet member through an adhesive material to form a joined part; and cutting the preceding sheet member at a position rearward of the joined part to join the preceding sheet member with a new sheet member, wherein the sheet members comprise any one of polymer sheets obtained by using any one or more of thermoplastic resins, heatcurable resins and rubber; woven fabrics or nonwoven fabrics formed by synthetic fibers, natural fibers or blended fibers constituted of these fibers; and composite sheets of these compounds, and the preceding sheet member is secured to the new sheet member at a position rearward of the joined part by laser welding.

2. The method of joining sheet members according to claim 1, wherein the step of laser welding is performed on a conveying roller installed in a conveying passage of the sheet members.

3. The method of joining sheet members according to claim 1, wherein the preceding sheet member is held between the conveying roller installed in the conveying passage of the sheet members and the new sheet member into tight contact with each other, and portions of the preceding sheet member and the new sheet member, which are held in tight contact with each other, are secured together by laser welding.

* * * * *